United States Patent
Baghel et al.

(10) Patent No.: US 11,089,493 B2
(45) Date of Patent: *Aug. 10, 2021

(54) METHOD AND APPARATUS FOR COMMUNICATING ISM PRONE FREQUENCY INFORMATION TO A BASE STATION

(71) Applicant: Samsung Electronics Co., Ltd., Suwon-si (KR)

(72) Inventors: Sudhir Kumar Baghel, Bangalore (IN); Venkateswara Rao Manepalli, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/782,595

(22) Filed: Feb. 5, 2020

(65) Prior Publication Data

US 2020/0178094 A1 Jun. 4, 2020

Related U.S. Application Data

(63) Continuation of application No. 16/372,890, filed on Apr. 2, 2019, now Pat. No. 10,567,982, which is a (Continued)

(30) Foreign Application Priority Data

Jan. 7, 2011 (IN) .............................. 62/CHE/2011

(51) Int. Cl.
*H04W 60/00* (2009.01)
*H04W 24/02* (2009.01)
(Continued)

(52) U.S. Cl.
CPC ........... *H04W 24/02* (2013.01); *H04L 5/0005* (2013.01); *H04W 16/14* (2013.01); *H04W 36/0094* (2013.01); *H04W 72/1215* (2013.01)

(58) Field of Classification Search
CPC ... H04W 88/06; H04W 36/20; H04W 72/082; H04W 24/10; H04W 72/1215;
(Continued)

(56) References Cited

U.S. PATENT DOCUMENTS 10,567,982 B2 * 2/2020 Baghel .............. H04W 36/0094
2006/0227741 A1 10/2006 Lappetelainen
(Continued)

FOREIGN PATENT DOCUMENTS

CN 101557627 A 10/2009
JP 2010-74403 A 4/2010
(Continued)

OTHER PUBLICATIONS

"Kickoff for SI on interference avoidance for in-device", 3GPP TSG-RAN WG2 Meeting #70bis, R2-103949, Jun. 28,-Jul. 2, 2010.
"Carrier Aggregation; measurement related open issues", 3GPP TSG-RAN WG2#71bis, R2-105510, Oct. 11-15, 2010.
"Discussion on moving LTE signal away from ISM band for in-device coexistence", 3GPP TSG-RAN WG2 #71bis, R2-105673, Oct. 11-15, 2010.
(Continued)

*Primary Examiner* — Quan M Hua
(74) *Attorney, Agent, or Firm* — Jefferson IP Law, LLP

(57) ABSTRACT

A method and an apparatus for handling in-device coexistence interference in a user equipment are provided. The method includes receiving a list of non-serving Long Term Evolution (LTE) frequencies from a base station, configuring the non-serving LTE frequencies so as to perform a measurement on the configured non-serving LTE frequencies, and detecting a likelihood of in-device coexistence interference between at least one of the non-serving LTE frequencies and an Industrial, Scientific and Medical (ISM) frequency when an ISM activity is ongoing on the ISM frequency.

15 Claims, 12 Drawing Sheets

Related U.S. Application Data continuation of application No. 13/978,485, filed as application No. PCT/KR2012/000175 on Jan. 6, 2012, now abandoned.

(51) Int. Cl.
| | | |
|---|---|---|
| *H04L 5/00* | (2006.01) | |
| *H04W 16/14* | (2009.01) | |
| *H04W 36/00* | (2009.01) | |
| *H04W 72/12* | (2009.01) | |

(58) Field of Classification Search
CPC ..... H04W 16/14; H04W 24/08; H04W 36/14; H04W 36/30; H04W 48/16; H04W 4/70; H04W 4/80; H04W 72/005; H04W 72/0406; H04W 76/14; H04W 76/15; H04W 76/23; H04W 84/12; H04W 92/18; H04W 28/0236; H04W 72/02; H04W 72/0446; H04W 72/1231; H04N 21/4383; H04N 21/44209; H04N 21/4508
See application file for complete search history.

(56) References Cited

U.S. PATENT DOCUMENTS

| | | |
|---|---|---|
| 2008/0025266 A1 | 1/2008 | Tynderfeldt et al. |
| 2008/0205365 A1 | 8/2008 | Russell et al. |
| 2009/0245216 A1* | 10/2009 | Banerjea ............... H04W 88/06 370/338 |
| 2010/0322287 A1* | 12/2010 | Truong ............... H04W 72/082 375/133 |
| 2011/0243047 A1 | 10/2011 | Dayal et al. |
| 2011/0243094 A1 | 10/2011 | Dayal et al. |
| 2012/0020231 A1 | 1/2012 | Chen et al. |
| 2012/0149429 A1 | 6/2012 | Martin et al. |
| 2012/0242584 A1 | 9/2012 | Tuli |

FOREIGN PATENT DOCUMENTS

| | | | |
|---|---|---|---|
| JP | 2013-524641 A | 6/2013 | |
| JP | 2013-534798 A | 9/2013 | |

OTHER PUBLICATIONS

"Email discussion on information from UE for FDM solution", 3GPP TSG-RAN WG2#72, R2-106291, Oct. 15-19, 2010.

Huawei Hisilicon; "Further consideration on FDM solution"; Nov. 15-19, 2010; 3rd Generation Partnership Project; 3GPP TSG-RAN WG2 Meeting #72; Jacksonville, USA, R2-106400.

Qualcomm Inc; "Problem Scenarios and Proposed Solutions for In-device Coexistence"; Aug. 23-27, 2010; 3rd Generation Partnership Project; 3GPP TSG-RAN WG2 Meeting #71; Madrid, Spain; R2-104910.

LG Electronics; "Possible Solutions for In-device Interference Avoidance"; Aug. 23-Aug. 27, 2010; 3rd Generation Partnership Project; 3GPP TSG-RAN2 Meeting #71; Madrid, Spain, R2-104880.

Samsung; "Possible FDM solution for in-device coexistence interference mitigation"; Oct. 11-Oct. 15, 2010; 3rd Generation Partnership Project; 3GPP TSG-RAN WG2 #71 bis; Xian, China; R2-105573.

LG Electronics; "New measurement for detecting I DC interference"; Nov. 14-Nov. 18, 2011; 3rd Generation Partnership Project; 3GPP TSG-RAN2 Meeting #76; San Francisco, U.S.A., R2-116320.

LG Electronics; "FDM procedure for avoiding I DC interference"; Oct. 10-Oct. 14, 2011; 3rd Generation Partnership Project; 3GPP TSG-RAN2 Meeting #75bis; Zhuhai, China; R2-115426.

ZTE; "Considerations on the detaii procedure for FDM approach"; Jan. 17-21, 2011; 3rd Generation Partnership Project; 3GPP TSG-RAN WG2 Meeting #72bis; Dublin, Ireland; R2-110243.

LG Electronics; "Possible enhancement for idle mode UE to avoid in-device coexistence interference"; Nov. 15-Nov. 19, 2010; 3rd Generation Partnership Project; 3GPP TSG-RAN2 Meeting #72; Jacksonville, U.S.A.; R2-106564.

3rd Generation Partnership Project; Technical Specification Group Radio Access Networks; Evolved Universal Terrestrial Radio Access (E-UTRA); Study on Signalling and Procedure for Interference Avoidance for In-Device Coexistence (Release 10) 3GPP TR 36.816 Publication Date Dec. 17, 2010.

In-Device Coexistence Interference between LTE and ISM Bands; 3GPP TSGRAN WG4 Ad-hoc Meeting 10-03 (R4-102416) R4-102416 Publication Date Jul. 28, 2010.

Pending U.S. Appl. No. 14/850,262 and 14/850,247, by Baghel et al. on Sep. 10, 2015.

* cited by examiner

METHOD AND APPARATUS FOR COMMUNICATING ISM PRONE FREQUENCY INFORMATION TO A BASE STATION

CROSS-REFERENCE TO RELATED APPLICATION(S)

This application is a continuation application of prior application Ser. No. 16/372,890, filed on Apr. 2, 2019, which will issue as U.S. Pat. No. 10,567,982 on Feb. 18, 2020, which is a continuation application of prior application Ser. No. 13/978,485, filed on Jul. 5, 2013, which was based on and claimed priority under 35 U.S.C. § 371 of an International application number PCT/KR2012/000175 filed on Jan. 6, 2012 in the International Intellectual Property Office and was based on and claimed priority under 35 U.S.C. § 365(b) of an Indian patent application number 62/CHE/2011, filed on Jan. 7, 2011 in the Indian Intellectual Property Office, the disclosure of which is incorporated by reference herein in its entirety.

BACKGROUND OF THE INVENTION

1. Field of the Invention

The present invention relates to a wireless communication system. More particularly, the present invention relates to a method of handling in-device coexistence in a user equipment.

2. Description of the Related Art

Coexistence of Long Term Evolution (LTE) with the Industrial, Scientific and Medical (ISM) (Bluetooth®, Wireless Fidelity (Wi-Fi®), and the like) band technologies and Global Navigation Satellite Systems (GNSS) is necessary to be provided as these are becoming very common combinations in User Equipments (UEs), such as cell phones. Each of these technologies is developed by a different group to serve a specific purpose. Characteristics of each of these technologies are different. They operate in different frequencies, have different access mechanism, have different frame structure, and peak transmit power.

When all these technologies operate simultaneously in an adjacent band, (a small separation e.g., <20 MHz) usually 50 decibels (dB) of isolation is required. However, a small form factor of the UE provides only 10-30 dB isolation. As a result, the transmitter of one radio severely affects the receiver of another radio. For example, a small form factor of the UE may pose great challenge of in-device coexistence interference from transmission of ISM technology to the receiver of cellular technologies, such as LTE or Worldwide Interoperability for Microwave Access (WiMax®). Similarly, the transmitter of cellular technology may cause severe in-device coexistence interference to the ISM receiver. The main cause of in-device co-existence issues may be because of receiver blocking due to a limited dynamic range of power amplifier, an Analog to Digital converter and out of band emission due to imperfect filtering.

LTE Coexistence with Bluetooth®

FIG. 1A is a schematic diagram illustrating a separation between LTE and Bluetooth® channels according to the related art.

Referring to FIG. 1A, an LTE band 7 UL and Bluetooth® band are separated by 20 MHz frequency band. The band 7 is Frequency Division Duplexing (FDD) band and hence the LTE receiver is not affected by the Bluetooth® transmitter whereas the LTE transmitter can affect the Bluetooth® receiver. In addition, there is very negligible separation of 2 MHz between LTE band 40 (i.e., a Time Division Duplexing (TDD) band) and the Bluetooth® frequency band. Therefore, it is not possible to discontinue using higher portion of LTE band 40 in a case of coexistence.

LTE Co-Existence with Wi-Fi®

FIG. 1B is a schematic diagram illustrating a separation between LTE and Wi-Fi® channels according to the related art.

Referring to FIG. 1B, there are 14 channels demarcated in an ISM band for a Wi-Fi® operation. Each channel is separated by 5 MHz with an exception of channel number 14, which is separated by 12 MHz. Channel 1 starts with 2401 MHz and hence there is almost no separation between LTE band 40 and Wi-Fi®. Channel 14 of Wi-Fi® ends at 2495 MHz, so theoretically only 5 MHz separation is available between the LTE band 7 and the Wi-Fi®. Different countries have different policies for a number of allowed channels of the Wi-Fi®. Currently, many countries allow only channel 1 to 13 whereas usage of channel number 14 is only allowed for an Institute of Electrical and Electronics Engineers (IEEE) 802.11b based communication. This suggests that even though in theory only 5 MHz separation is available between the Wi-Fi® and the LTE band 7, at least 17 MHz is available in practice.

Currently known solutions for handling in-device coexistence includes a Time Division Multiplexing (TDM) based solution, a Frequency Division Multiplexing (FDM) based solution or a combination of both. In an FDM based solution, a UE is configured to report a presence of in-device coexistence interference between a serving LTE frequency of the LTE band and an ISM frequency of the ISM band to a base station. Accordingly, the base station decides to handover the UE to a different frequency not affected by an ISM activity or not affecting the ISM activity. Additionally, when the ISM activity has completed, the UE informs the same to the base station.

Therefore, a need exists for a method of handling in-device coexistence in a UE.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method of handling in-device coexistence in a User Equipment (UE).

FIG. 2 is a schematic diagram illustrating a ping pong scenario during handover of a User Equipment (UE) between an LTE frequency not affected by an ISM frequency and another LTE frequency affected by the ISM frequency according to an embodiment of the present invention.

Typically, a base station configures a UE with one or more non-serving Long Term Evolution (LTE) frequencies for performing measurements. The measurements are performed on these frequencies as the base station can handover the UE from the serving frequency to any of one or more non-serving LTE frequencies based on the measurements. The target LTE frequency selected for handover may be affected by an Industrial, Scientific and Medical (ISM) activity. However, when the base station performs the handover to the target LTE frequency, the base station is not aware that the target LTE frequency is affected by the ISM activity or will affect the ISM activity. As a consequence, the base station performs handover of the UE to the target LTE frequency. Thus, the UE may request the base station to move it away from the affected target LTE frequency. This may lead to a ping-pong effect between an LTE frequency affected by the ISM activity and an LTE frequency not affected by the ISM activity similar to the scenario illustrated in FIG. 2.

In accordance with an aspect of the present invention, a method is provided. The method includes detecting a likelihood of in-device coexistence interference between at least one of non-serving LTE frequencies and an ISM frequency when an ISM activity is ongoing on the ISM frequency, and reporting the likelihood of in-device coexistence interference between the at least one of the non-serving LTE frequencies and the ISM frequency to a base station.

In accordance with another aspect of the present invention, an apparatus is provided. The apparatus includes a processor, and a memory coupled to the processor, wherein the memory includes an interference handler configured to detect a likelihood of in-device coexistence interference between at least one of non-serving LTE frequencies and an ISM frequency when an ISM activity is ongoing on the ISM frequency, and configured to report the likelihood of in-device coexistence interference between the at least one of the non-serving LTE frequencies and the ISM frequency to a base station.

Other aspects, advantages, and salient features of the invention will become apparent to those skilled in the art from the following detailed description, which, taken in conjunction with the annexed drawings, discloses various embodiments of the invention.

BRIEF DESCRIPTION OF DRAWINGS

The above and other aspects, features, and advantages of certain embodiments of the present invention will be more apparent from the following description taken in conjunction with the accompanying drawings, in which.

Figure 1A:
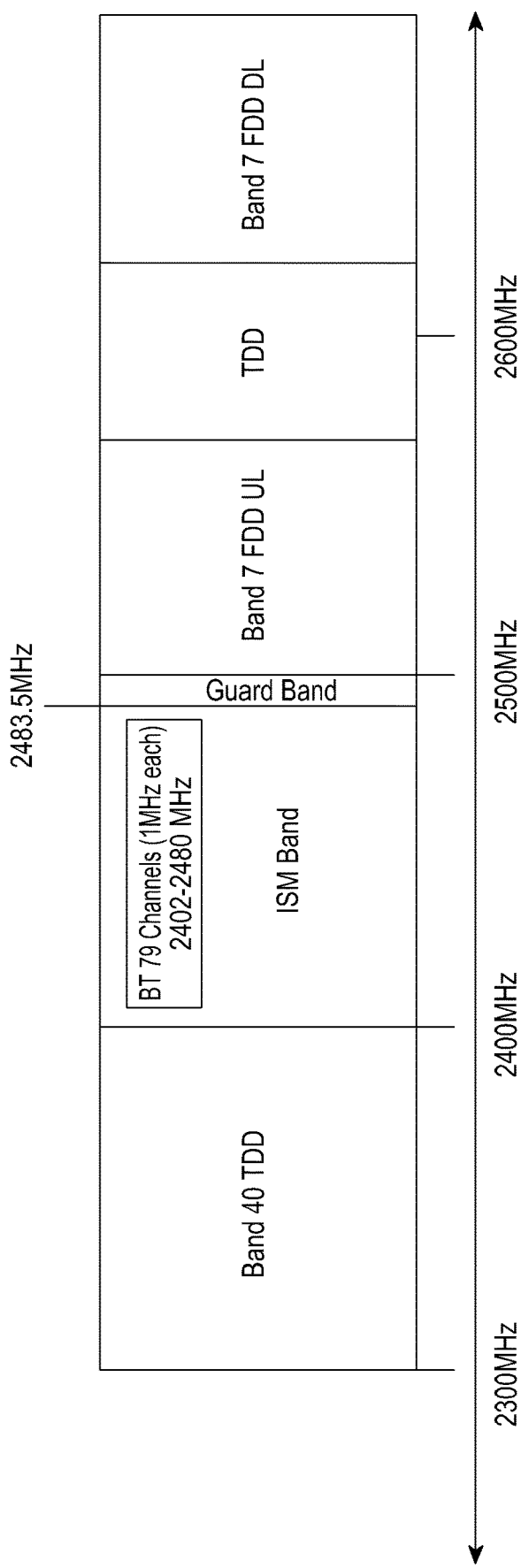
FIG. 1A is a schematic diagram illustrating a separation between Long Term Evolution (LTE) and Bluetooth® channels according to the related art.
Figure 1B:
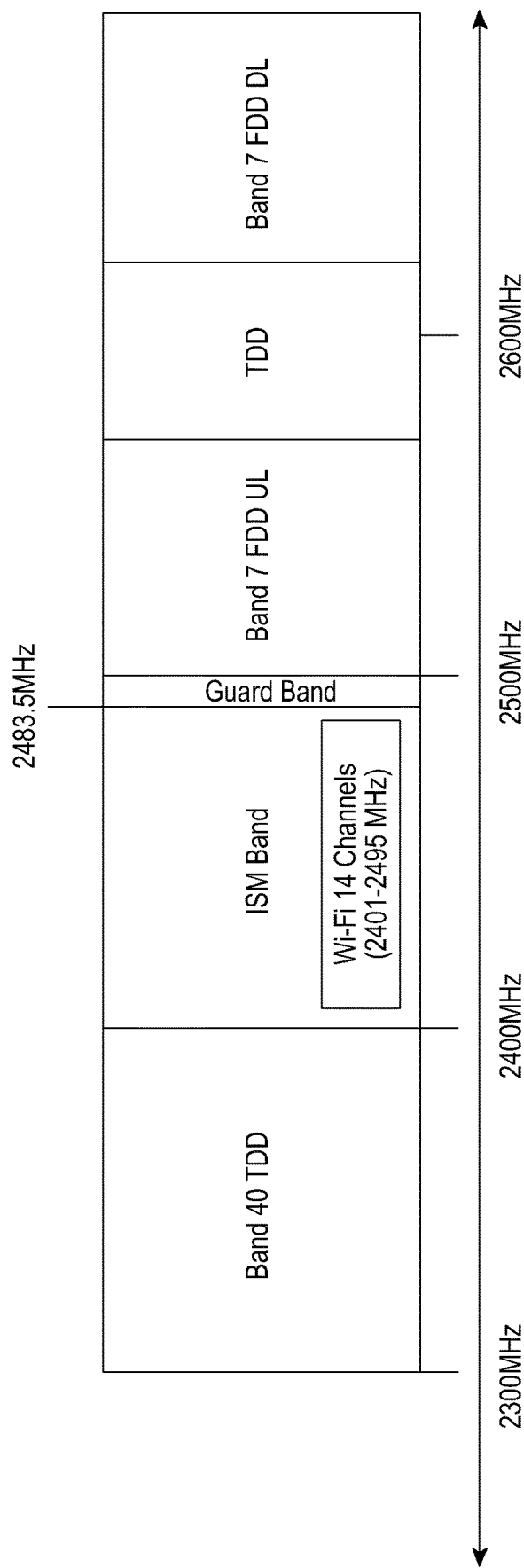
FIG. 1B is a schematic diagram illustrating a separation between LTE and Wireless Fidelity (Wi-Fi®) channels according to the related art.
Figure 2:
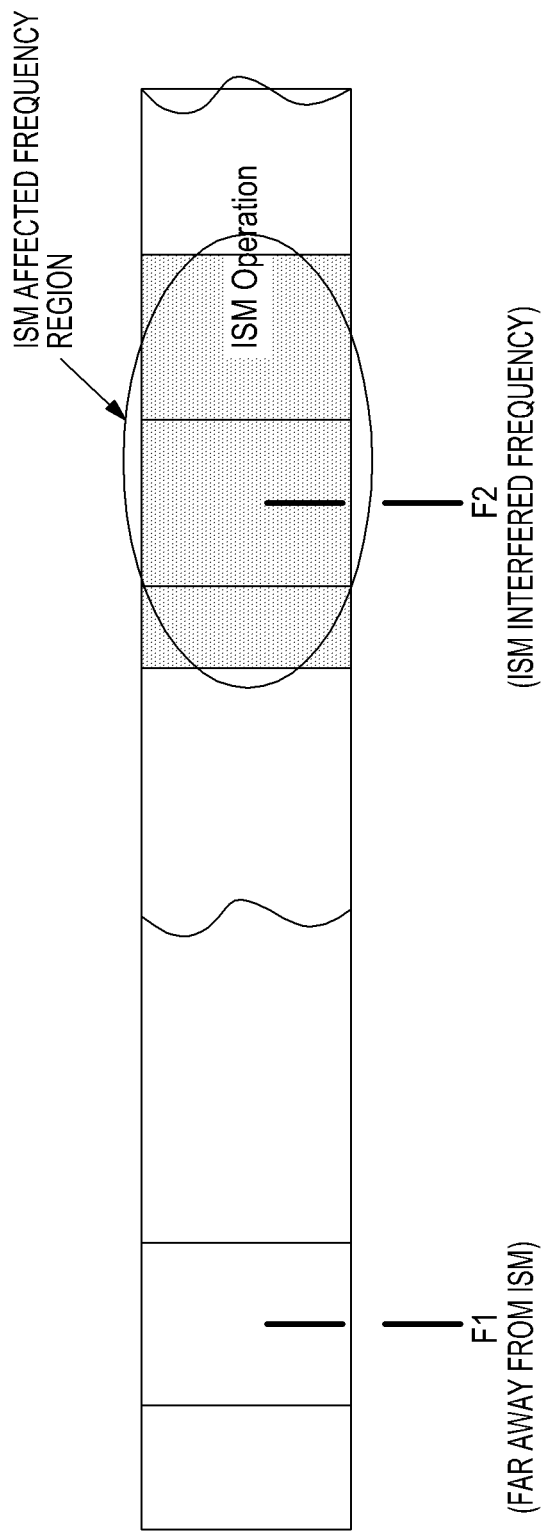
FIG. 2 is a schematic diagram illustrating a ping pong scenario during handover of a user equipment between an LTE frequency not affected by an Industrial, Scientific and Medical (ISM) frequency and another LTE frequency affected by the ISM frequency according to an embodiment of the present invention.

The drawings described herein are for illustration purposes only and are not intended to limit the scope of the present disclosure in any way.

Throughout the drawings, like reference numerals will be understood to refer to like parts, components, and structures.

DETAILED DESCRIPTION OF EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 3:
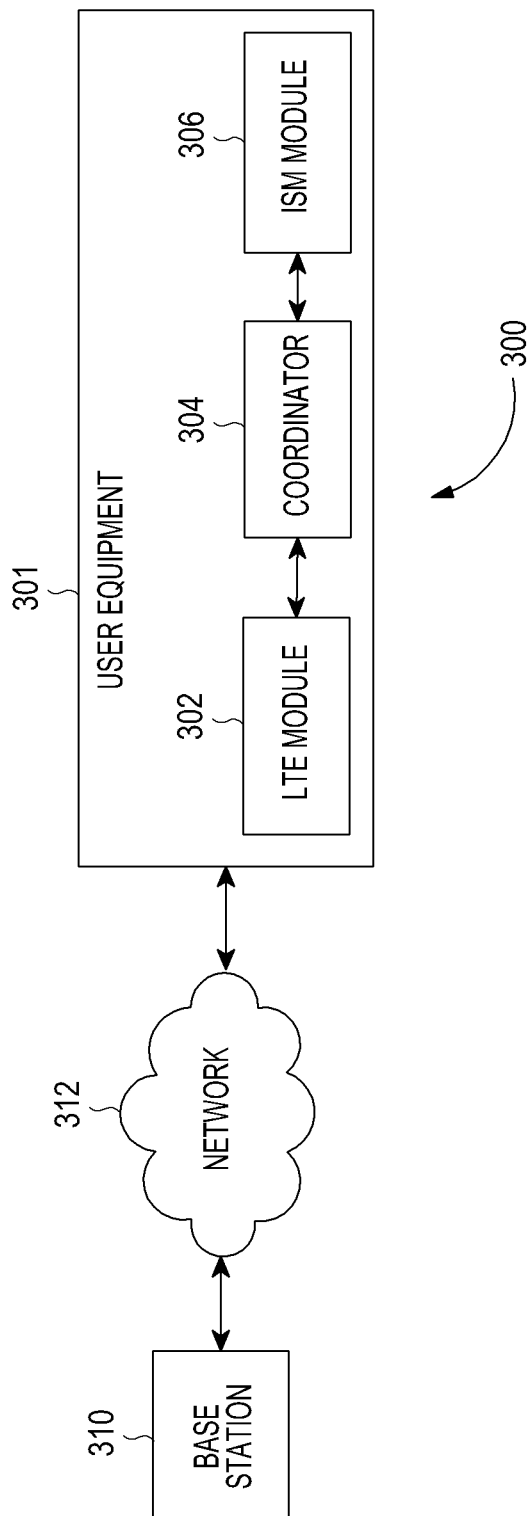
FIG. 3 is a block diagram illustrating a wireless communication system capable of handling in-device co-existence interference between one or more non-serving LTE frequencies and an ISM frequency configured for a user equipment according to an embodiment of the present invention.

FIG. 3 is a block diagram illustrating a wireless communication system capable of handling in-device co-existence interference between one or more non-serving Long Term Evolution (LTE) frequencies and an Industrial, Scientific and Medical (ISM) frequency configured for a user equipment according to an embodiment of the present invention.

Referring to FIG. 3, a wireless communication system 300 includes a User Equipment (UE) 301 and a base station (e.g., an evolved Node B (eNB)) 310 connected to the UE 301 via a wireless network (e.g., an LTE network) 312. The UE 301 includes an LTE module 302, a coordinator 304 and an ISM module 304.

Consider that the UE 301 is operating in the connected mode and performs uplink and downlink data transmission with the base station 310 over a serving LTE frequency. In addition, consider that, during the operation of the UE 301 in the connected mode, the base station 310 configures non-serving LTE frequencies for the UE 301 to perform a measurement on the non-serving LTE frequencies. Thereafter, the base station 310 sends a list of the non-serving LTE frequencies to the UE 301. Accordingly, the coordinator 304 configures the non-serving LTE frequencies for performing measurements in corresponding measurement gaps.

During the operation in a connected mode, consider that the coordinator 304 detects that there is a likelihood of in-device co-existence interference between one or more configured non-serving LTE frequencies and an ISM frequency on which an ISM activity is performed by the ISM module 306. Thus, the coordinator 304 reports that the ISM activity is ongoing and there is a likelihood of in-device coexistence interference between the one or more non-serving LTE frequencies and the ISM frequency to the base station 310. Therefore, the base station 310 avoids performing handover of the UE 301 to the one or more serving LTE frequencies affected by the ISM frequency. In a case of handover, the base station 310 may communicate the likelihood of in-device coexistence interference to another base station with which the handover of the user equipment 301 is performed.

The ISM module 306 may be turned off upon completion of the ongoing ISM activity. When the ISM module 306 is turned off, the coordinator 304 detects that the ISM module 306 is turned off and hence the coordinator 304 reports to the base station 310 that the ISM activity has completed and the ISM module 306 is turned off. Thus, the coordinator 304 can reconfigure the one or more non-serving LTE frequencies for performing measurements. In addition, the base station 310 may consider any of the one or more non-serving LTE frequencies for handover from the serving frequency from the user equipment 301.

Alternatively, in one embodiment of the present invention, the base station 310 sets a timer value for which the one or more non-serving LTE frequencies are blocked for performing a measurement. In addition, the base station 310 sends the timer value to the user equipment 301. Further, the base station 310 sends an updated list of the non-serving LTE frequencies to the user equipment 301 upon expiry of the timer value, where the updated list includes the at least one of the non-serving LTE frequencies previously affected by the ISM activity. Accordingly, the user equipment 301 configures the non-serving LTE frequencies in the updated list for performing a measurement.

In another embodiment of the present invention, the user equipment 301 sets a timer value during which the at least one of the non-serving LTE frequencies is to be blocked for performing a measurement. The UE 301 communicates the timer value to the base station 310 while reporting the likelihood of in-device coexistence interference between the at least one of the non-serving LTE frequencies and the ISM frequency to the base station. The base station 310 sends an updated list of the non-serving LTE frequencies upon expiry of the timer value, where the updated list of the non-serving frequencies includes the at least one of the non-serving LTE frequencies. Accordingly, the user equipment 301 configures the non-serving LTE frequencies in the updated list for performing a measurement.

In yet another embodiment of the present invention, the UE 301 sets a timer value during which the at least one of non-serving LTE frequencies is to be blocked for performing a measurement. Further, the UE 301 adds the removed at least one of the non-serving LTE frequencies in the list of the non-serving LTE frequencies for performing measurements upon expiry of the timer value.

In the above embodiments of the present invention, the expiry of the timer value indicates that the ISM activity has completed. In other words, the expiry of timer value indicates that the one or more non-serving LTE frequencies are no more likely to be affected by the ISM activity as the ISM module 306 is turned off. Thus, the UE 301 can perform measurements on the previously affected non-serving LTE frequencies and the base station 310 may consider any of the one or more non-serving LTE frequencies for handover from the serving frequency from the user equipment 301 upon expiry of the timer value (i.e., upon completion of the ISM activity).

Figure 4:
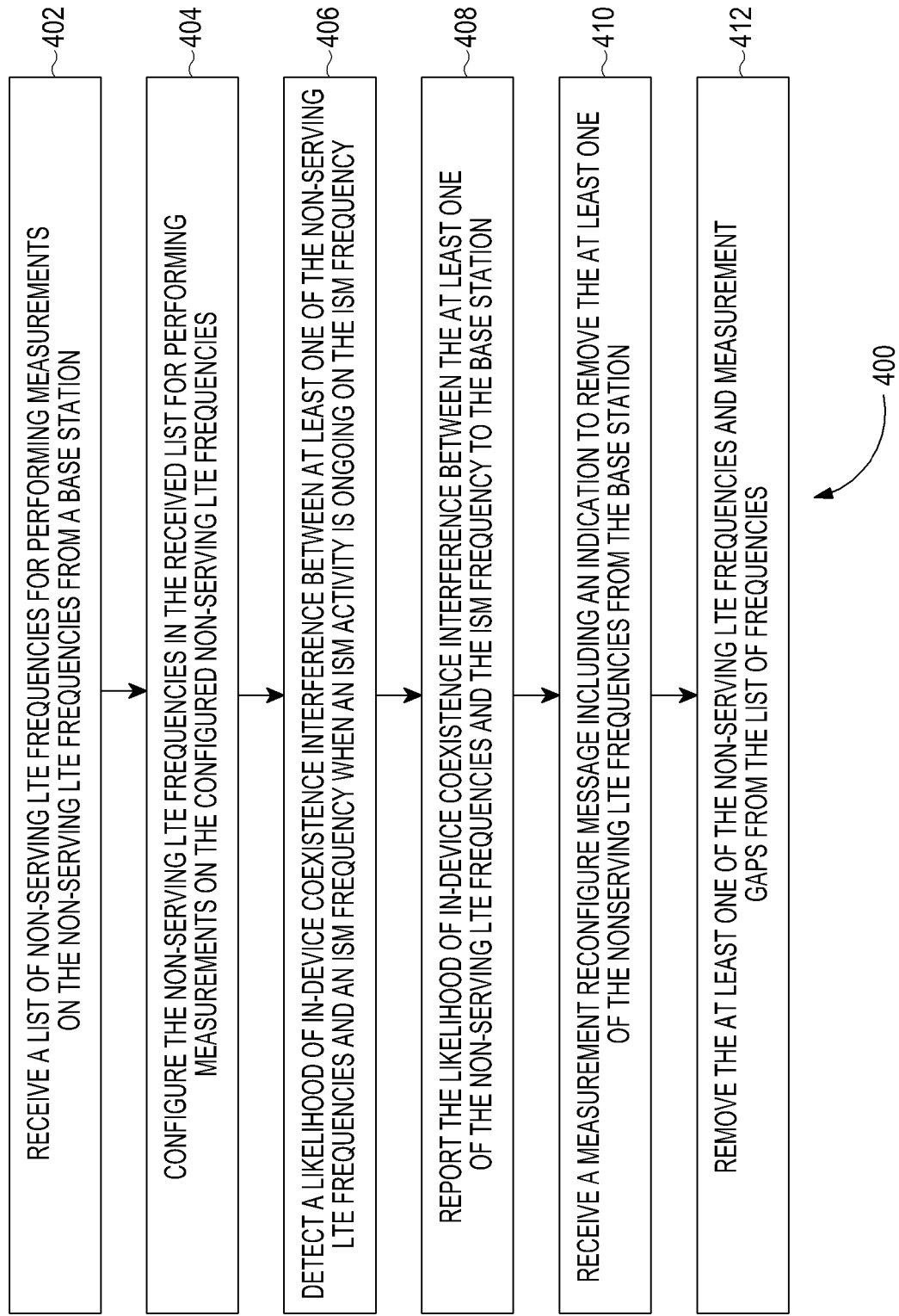
FIG. 4 is a flowchart illustrating a method of handling in-device co-existence interference between one or more non-serving LTE frequencies and an ISM frequency configured for a user equipment according to an embodiment of the present invention.

FIG. 4 is a flowchart illustrating a method of handling in-device co-existence interference between one or more non-serving LTE frequencies and an ISM frequency configured for a user equipment according to an embodiment of the present invention.

Referring to FIG. 4, at operation 402, a list of non-serving LTE frequencies to be configured for performing measurements is received from the base station 310. At operation 404, the non-serving LTE frequencies in the received list are configured by the user equipment 301.

When the LTE module 302 is performing LTE activity on a serving LTE frequency, the controller 304 determines that the ISM module 306 is switched on for performing ISM activity on an ISM frequency. In such a case, at operation 406, the UE detects a likelihood of in-device co-existence interference between one or more of the non-serving LTE frequencies and the ISM frequency. Accordingly, at operation 408, the likelihood of in-device co-existence interference between one or more non-serving LTE frequencies and the ISM frequency is reported to the base station.

At operation 410, a response message with an instruction to remove the one or more non-serving LTE frequencies from the list of configured non-serving LTE frequencies is received from the base station 310. At operation 412, the one or more non-serving LTE frequencies and corresponding measurement gaps are removed from the list of configured non-serving LTE frequencies by the user equipment 301. In an alternate embodiment of the present invention, the one or more non-serving LTE frequencies and corresponding measurement gaps are automatically removed from the list by the user equipment 301 upon detecting the likelihood of in-device co-existence interference. In other words, the one or more non-serving LTE frequencies are de-configured for performing measurements till the ISM activity is ongoing on the ISM frequency.

In one embodiment of the present invention, the user equipment 301 avoids performing measurements on the one or more non-serving LTE frequencies affected by the ongoing ISM activity in the measurement gaps. In another embodiment of the present invention, the base station 310 avoids performing handover from the serving frequency to any of the one or more non-serving LTE frequencies by the ongoing ISM activity. Upon completion of the ISM activity, the user equipment 301 informs the base station 310 that the ISM activity is complete and there is no likelihood of in-device co-existence interference between the one or more non-serving LTE frequencies and the ISM frequency. Thus, the user equipment 301 can reconfigure the one or more non-serving LTE frequencies for performing measurements. In addition, the base station 310 may consider any of the one or more non-serving LTE frequencies for handover from the serving frequency based on the measurement report from the user equipment 301.

Figure 5:
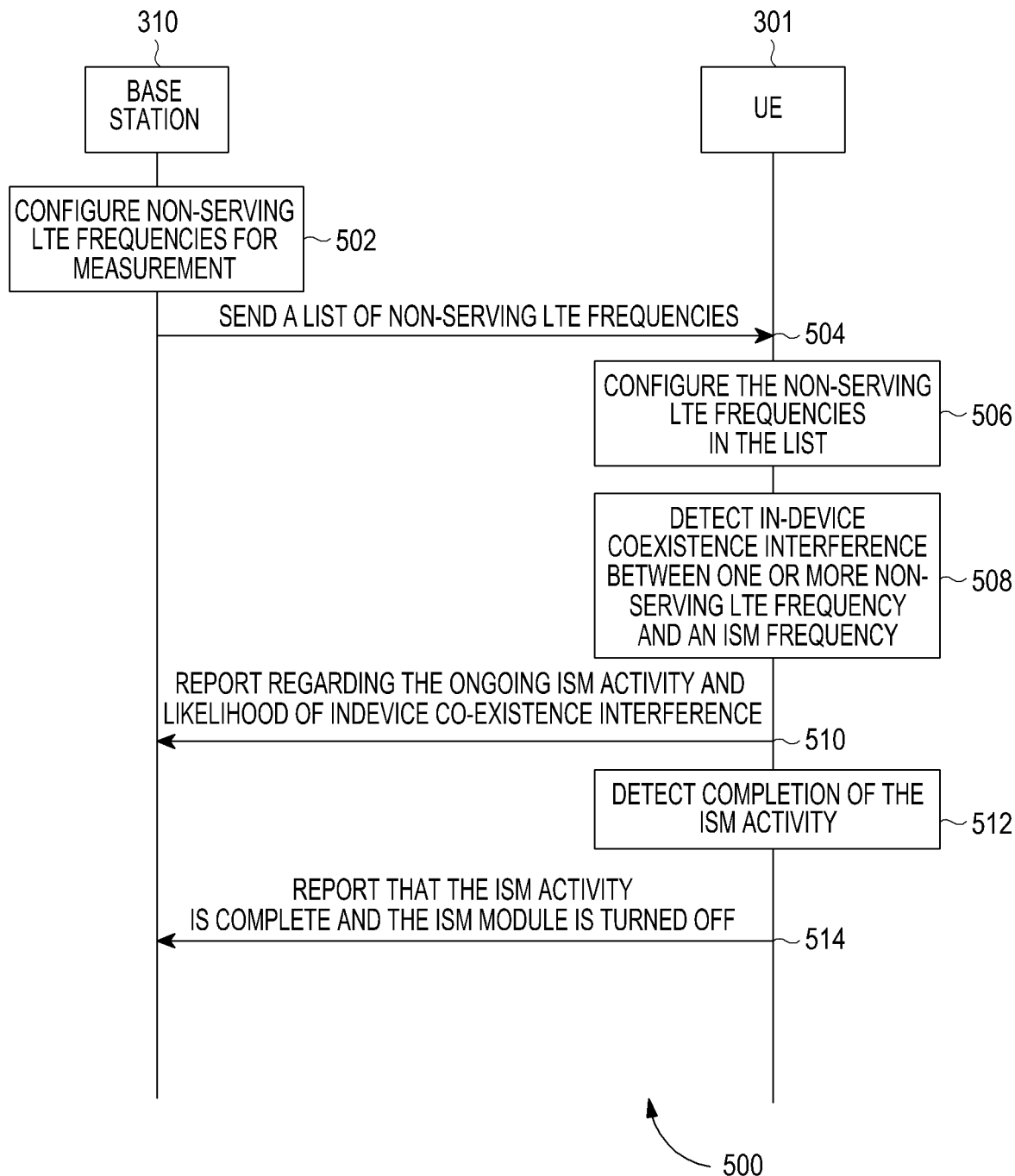
FIG. 5 is a flow diagram of a method of handling in-device co-existence interference between one or more non-serving LTE frequencies and an ISM frequency configured for a user equipment according to an embodiment of the present invention.

FIG. 5 is a flow diagram of a method of handling in-device co-existence interference between one or more non-serving LTE frequencies and an ISM frequency configured for a user equipment according to an embodiment of the present invention.

Referring to FIG. 5, at operation 502, the base station 310 configures non-serving LTE frequencies for performing a measurement. At operation 504, the base station 310 sends a list of the non-serving LTE frequencies to the user equipment 301. At operation 506, the user equipment 301 configures the non-serving LTE frequencies for performing measurements in corresponding measurement gaps.

At operation 508, the user equipment 301 detects that there is a likelihood of in-device co-existence interference between one or more configured non-serving LTE frequencies and an ISM frequency on which an ISM activity is performed by the ISM module 306. At operation 510, the user equipment 301 reports that the ISM activity is ongoing and there is a likelihood of in-device coexistence interference between the one or more non-serving LTE frequencies and the ISM frequency to the base station 310 in a measurement report or any other new message. For example, the UE 301 sends a measurement report indicating that there is a likelihood of in-device co-existence interference upon availability of measurement results or may send the indication through a new message upon detection of the likelihood of in-device co-existence interference. Thus, the base station 310 avoids performing handover of the user equipment 301 to the one or more serving LTE frequencies affected by the ISM frequency.

The base station 310 may communicate the likelihood of in-device coexistence interference to another base station with which the handover of the user equipment 301 is performed. Further, if there are any measurement gaps for performing the measurement, the UE 301 and the base station 310 may continue or discontinue with the measurement gaps by communicating synchronously with the base station 310. For example, the UE 301 may send such information as part of the measurement report if the non-serving LTE frequencies affected by the ISM activity are observed to be stronger.

The ISM module 306 is turned off when the ongoing ISM activity is complete. When the ISM module 306 is turned off, at operation 512, the user equipment 301 detects that the ISM module 306 is turned off. At operation 514, the user equipment 301 reports to the base station 310 that the ISM activity is complete and the ISM module 306 is turned off Thus, the user equipment 301 can reconfigure the one or more non-serving LTE frequencies for performing measurements. In addition, the base station 310 may consider any of the one or more non-serving LTE frequencies for handover from the serving frequency based on the measurement report from the user equipment 301.

Figure 6:
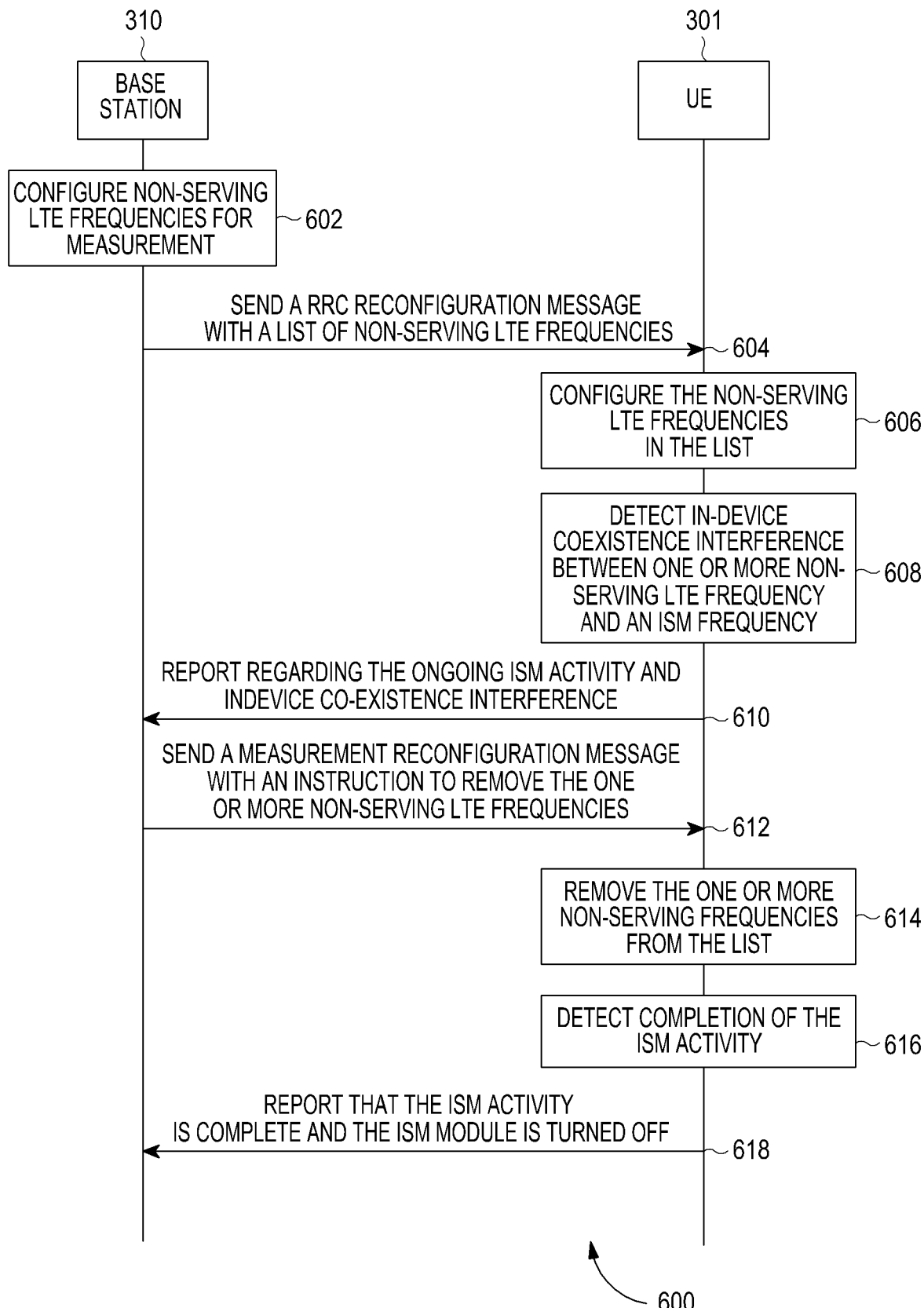
FIG. 6 is a flow diagram of a method of handling in-device co-existence interference between one or more non-serving LTE frequencies and an ISM frequency configured for a user equipment according to an embodiment of the present invention.

FIG. 6 is a flow diagram of a method of handling in-device co-existence interference between one or more non-serving LTE frequencies and an ISM frequency configured for a user equipment according to an embodiment of the present invention.

Referring to FIG. 6, at operation 602, the base station 310 configures non-serving LTE frequencies for performing a measurement. At operation 604, the base station 310 sends a Radio Resource Connection (RRC) reconfiguration message with a list of the non-serving LTE frequencies to the user equipment 301. At operation 606, the user equipment 301 configures the non-serving LTE frequencies listed in the RRC reconfiguration message for performing measurements in corresponding measurement gaps.

At operation 608, the user equipment 301 detects that there is a likelihood of in-device co-existence interference between one or more configured non-serving LTE frequencies and an ISM frequency on which an ISM activity is performed by the ISM module 306. At operation 610, the user equipment 301 reports that the ISM activity is ongoing and there is a likelihood of in-device coexistence interference between the one or more non-serving LTE frequencies and the ISM frequency to the base station 310 in a measurement report. At operation 612, the base station 310 sends a measurement reconfiguration message with an instruction to remove the one or more non-serving LTE frequencies from the list of non-serving LTE frequencies configured for performing a measurement. At operation 614, the user equipment 301 removes the one or more non-serving LTE frequencies from the list of configured non-serving LTE frequencies based on the measurement reconfiguration message.

The ISM module 306 is turned off when the ongoing ISM activity is complete. When the ISM module 306 is turned off, at operation 616, the user equipment 301 detects that the ISM module 306 is turned off. At operation 618, the user equipment 301 reports to the base station 310 that the ISM activity is complete and the ISM module 306 is turned off Thus, the user equipment 301 can reconfigure the one or more non-serving LTE frequencies for performing measurements. In addition, the base station 310 may consider any of the one or more non-serving LTE frequencies for handover from the serving frequency based on the measurement report from the user equipment 301.

Figure 7:
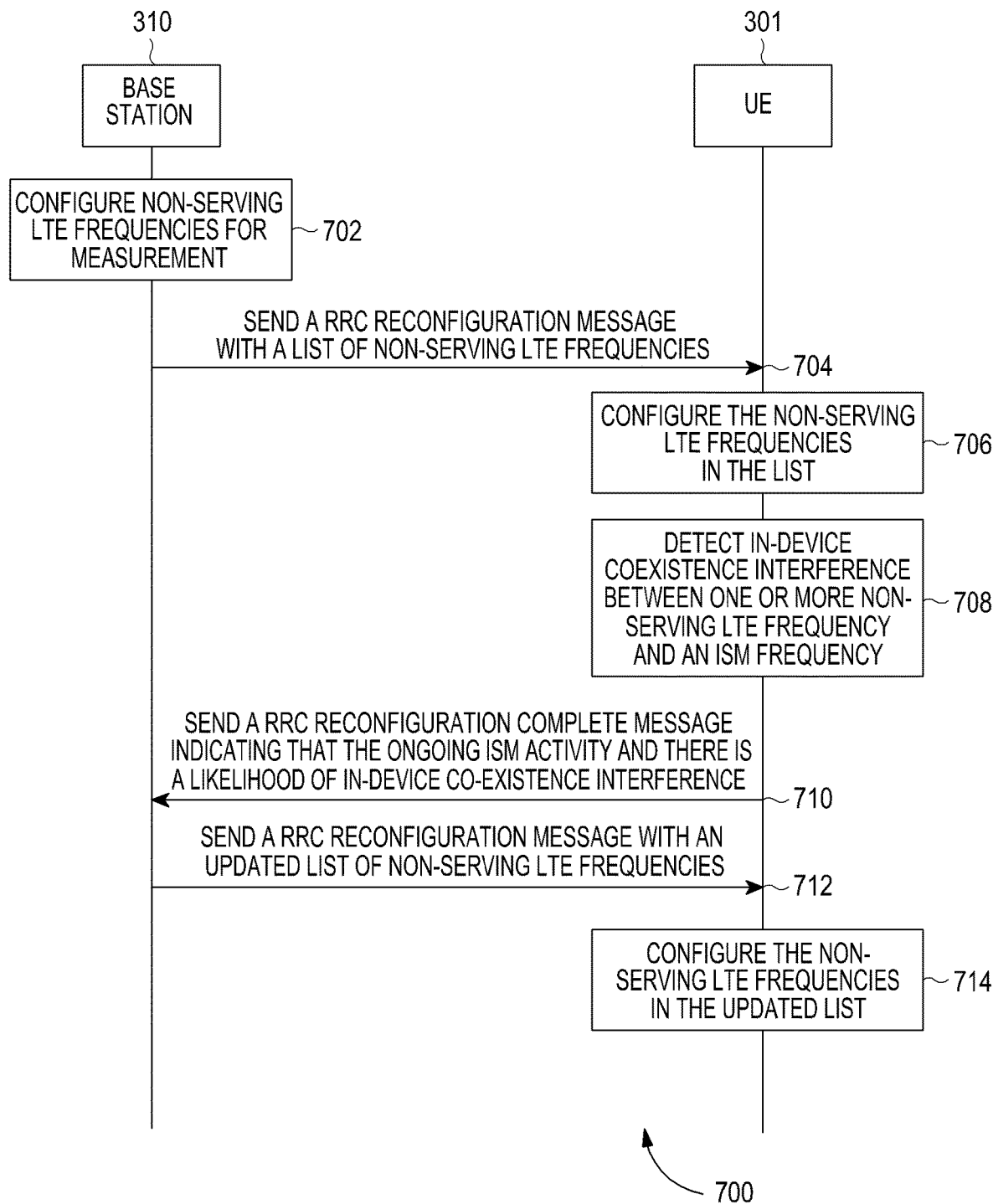
FIG. 7 is a flow diagram of a method of handling in-device co-existence interference between one or more non-serving LTE frequencies and an ISM frequency configured for a user equipment according to an embodiment of the present invention.

FIG. 7 is a flow diagram of a method of handling in-device co-existence interference between one or more non-serving LTE frequencies and an ISM frequency configured for a user equipment according to an embodiment of the present invention.

Referring to FIG. 7, at operation 702, the base station 310 configures non-serving LTE frequencies for performing a measurement. At operation 704, the base station 310 sends an RRC reconfiguration message with a list of non-serving LTE frequencies to the user equipment 301. At operation 706, the user equipment 301 configures the non-serving LTE frequencies listed in the RRC reconfiguration message for performing measurements in corresponding measurement gaps.

At operation 708, the user equipment 301 detects that there is a likelihood of in-device co-existence interference between one or more configured non-serving LTE frequencies and an ISM frequency on which an ISM activity is performed by the ISM module 306. At operation 710, the user equipment 301 sends an RRC reconfiguration complete message indicating that the ISM activity is ongoing and there is a likelihood of in-device coexistence interference between the one or more non-serving LTE frequencies and the ISM frequency to the base station 310. In one implementation, the RRC reconfiguration message includes a new rejection cause indicating that one or more non-serving LTE frequencies are affected by the ISM activity and an information element indicating a list of one or more non-serving LTE frequencies affected by the ISM activity.

At operation 712, the base station 310 sends a new RRC reconfiguration message with an updated list of non-serving LTE frequencies. The updated list of non-serving LTE frequencies excludes the one or more non-serving LTE frequencies that are affected by the ongoing ISM activity. At operation 714, the user equipment 301 configures the non-serving LTE frequencies from the updated list of non-serving LTE frequencies for performing a measurement.

Figure 8:
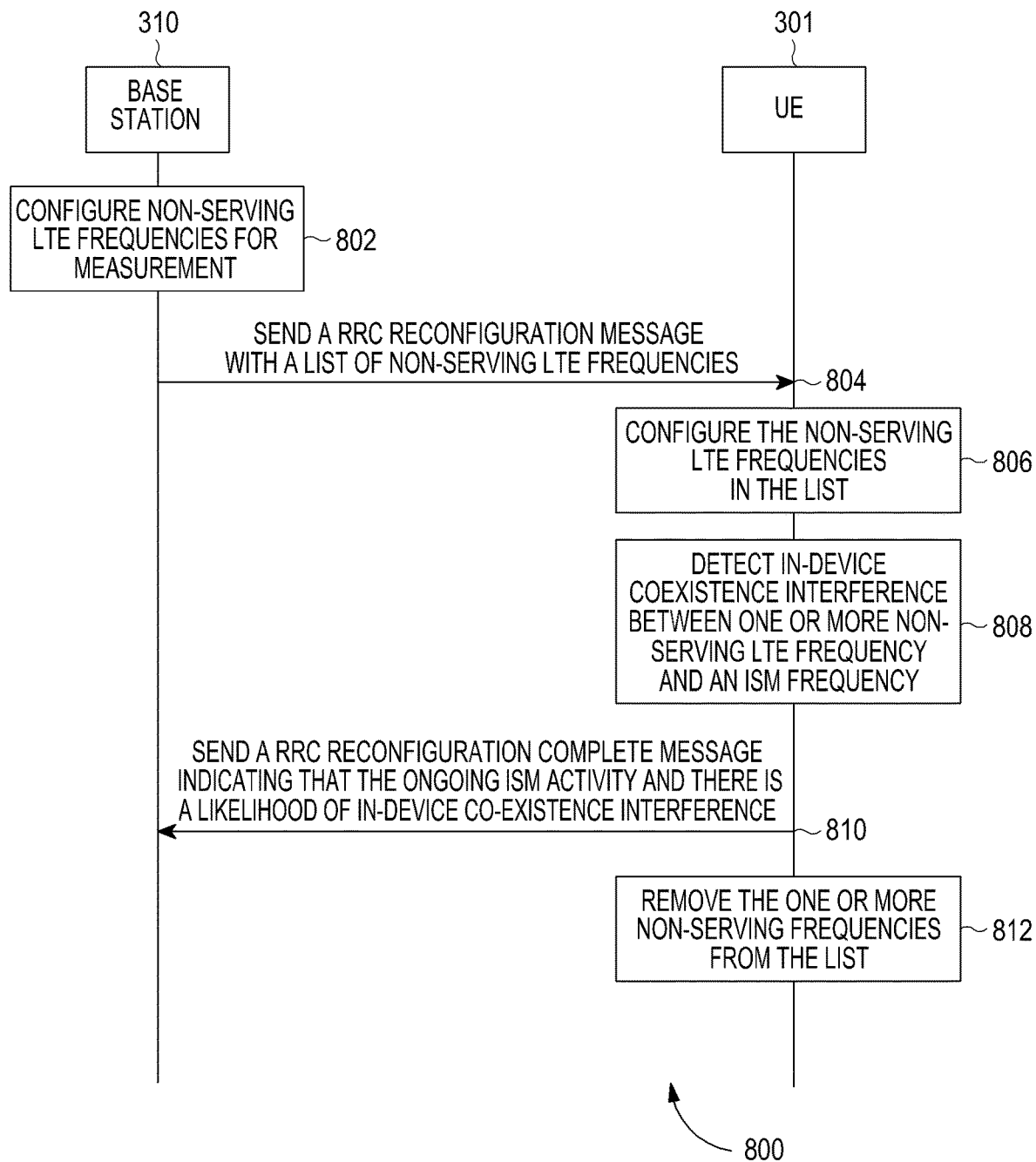
FIG. 8 is a flow diagram of a method of handling in-device co-existence interference between one or more non-serving LTE frequencies and an ISM frequency configured for a user equipment according to an embodiment of the present invention.

FIG. 8 is a flow diagram of a method of handling in-device co-existence interference between one or more non-serving LTE frequencies and an ISM frequency configured for a user equipment according to an embodiment of the present invention.

Referring to FIG. 8, at operation 802, the base station 310 configures non-serving LTE frequencies for performing a measurement. At operation 804, the base station 310 sends an RRC reconfiguration message with a list of non-serving LTE frequencies to the user equipment 301. At operation 806, the user equipment 301 configures the non-serving LTE frequencies listed in the RRC reconfiguration message for performing measurements in corresponding measurement gaps.

At operation 808, the user equipment 301 detects that there is a likelihood of in-device co-existence interference between one or more configured non-serving LTE frequencies and an ISM frequency on which an ISM activity is performed by the ISM module 306. At operation 810, the user equipment 301 sends an RRC reconfiguration complete message indicating that the ISM activity is ongoing and there is a likelihood of in-device coexistence interference between the one or more non-serving LTE frequencies and the ISM frequency to the base station 310. In one implementation, the RRC reconfiguration message includes a new rejection cause indicating that one or more non-serving LTE frequencies are affected by the ISM activity and an information element indicating a list of one or more non-serving LTE frequencies affected by the ISM activity. Although, the RRC reconfiguration is rejected by the UE 301, the connection between the base station 310 and the UE 301 is maintained and hence no connection re-establishment needs to be performed.

At operation 812, the user equipment 301 removes the one or more non-serving LTE frequencies and corresponding measurement gaps from the list of configured non-serving LTE frequencies. It can be noted that the UE 301 may continue to perform measurements on other non-serving LTE frequencies that are not affected by the ISM activity.

Figure 9:
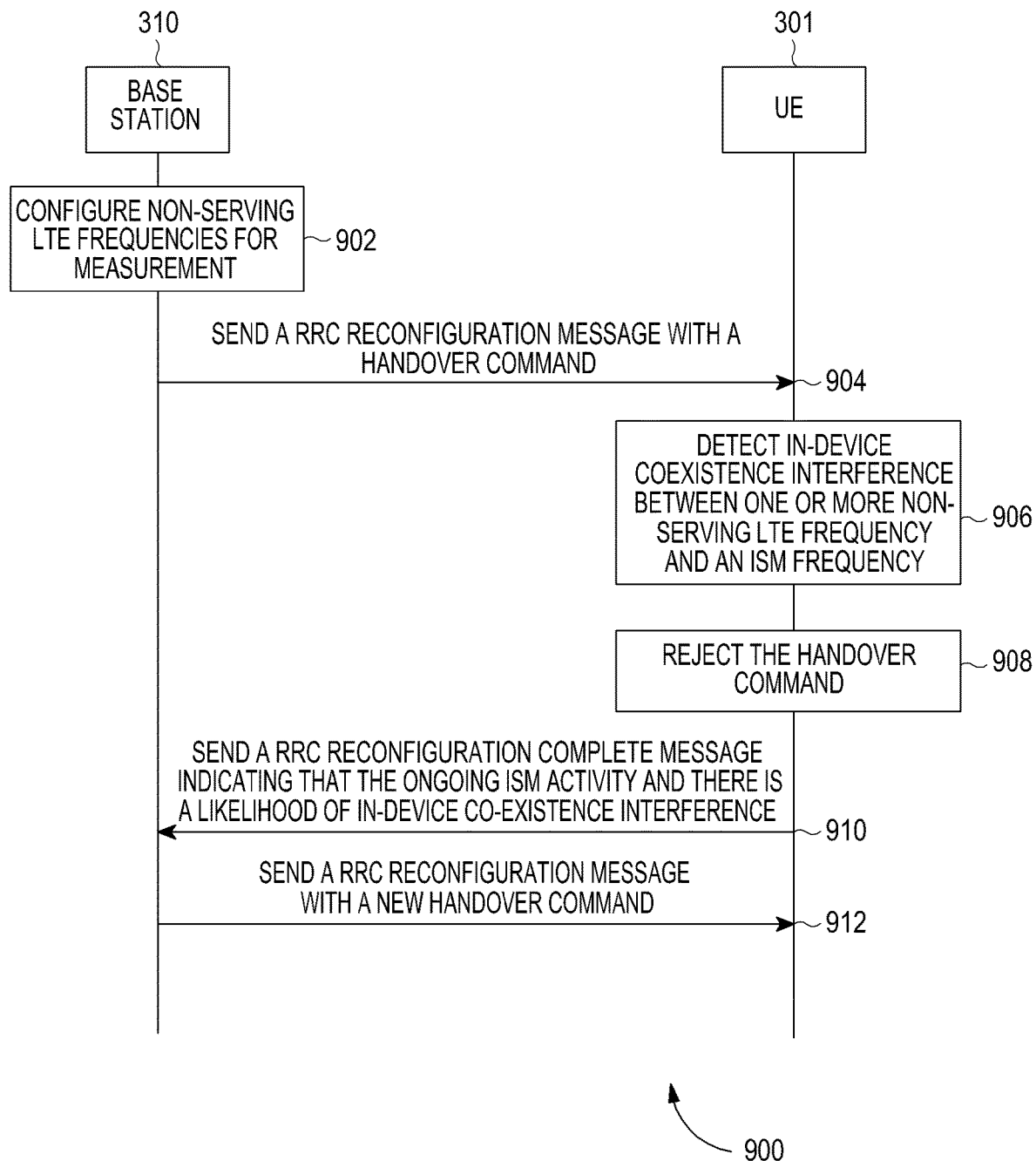
FIG. 9 is a flow diagram of a method of handling in-device co-existence interference between one or more non-serving LTE frequencies and an ISM frequency configured for a user equipment according to an embodiment of the present invention.

FIG. 9 is a flow diagram of a method of handling in-device co-existence interference between one or more non-serving LTE frequencies and an ISM frequency configured for a user equipment according to an embodiment of the present invention.

Referring to FIG. 9, at operation 902, the base station 310 configures non-serving LTE frequencies for performing a measurement. At operation 904, the base station 310 sends an RRC reconfiguration message with a handover command for performing a handover from the serving LTE frequency to a configured non-serving LTE frequency.

At operation 906, the user equipment 301 detects that there is a likelihood of in-device co-existence interference between the non-serving LTE frequency and an ISM frequency on which an ISM activity is performed by the ISM module 306. At operation 908, the user equipment 301 rejects the handover command in the RRC reconfiguration message. At operation 910, the user equipment 301 sends an RRC reconfiguration complete message to the base station 310 indicating that the ISM activity is ongoing and there is a likelihood of in-device coexistence interference between the non-serving LTE frequency and the ISM frequency. In one implementation, the RRC reconfiguration message includes a new rejection cause indicating that the target non-serving LTE frequency is affected by the ISM activity. At operation 912, the base station 310 sends a new RRC reconfiguration message with a handover command for performing handover from the serving LTE frequency to another non-serving LTE frequency not affected by the ongoing ISM activity.

When the RRC reconfiguration message is rejected, the RRC connection needs to be re-established. However, according to an embodiment of the present invention, there is no need for re-establishing the RRC connection between the UE 301 and the base station 310. In addition, when an RRC reconfiguration message is meant for handover, a source cell may not be listening to any subsequent message transmitted by the UE 301. As the result, a success may be received by a target cell or a failure, which needs a connection re-establishment, may be received by a target cell.

Figure 10:
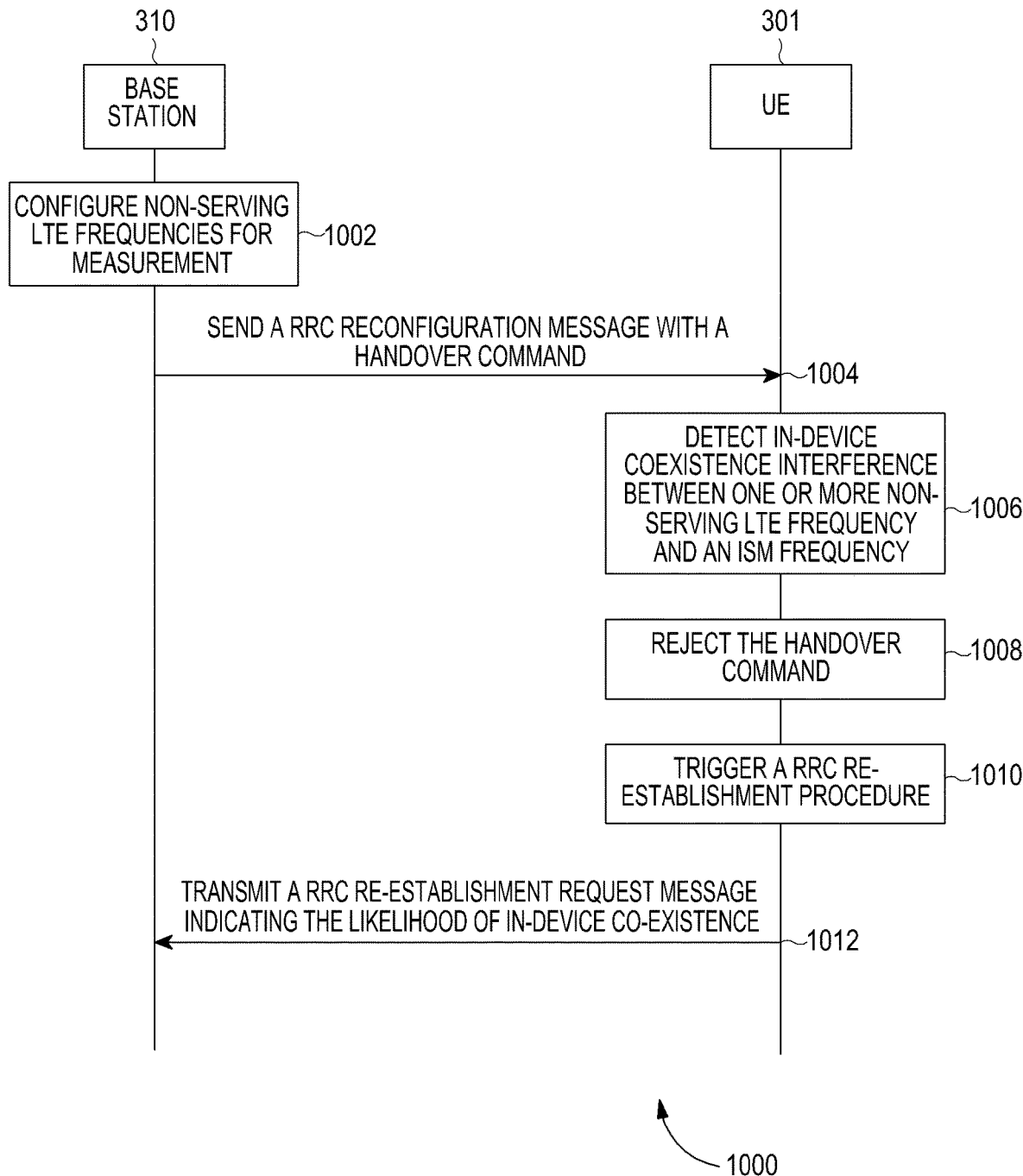
FIG. 10 is a flow diagram of a method of handling in-device co-existence interference between one or more non-serving LTE frequencies and an ISM frequency configured for a user equipment according to an embodiment of the present invention.

FIG. 10 is a flow diagram of a method of handling in-device co-existence interference between one or more non-serving LTE frequencies and an ISM frequency configured for a user equipment according to an embodiment of the present invention.

Referring to FIG. 10, at operation 1002, the base station 310 configures non-serving LTE frequencies for performing a measurement. At operation 1004, the base station 310 sends an RRC reconfiguration message with a handover command for performing a handover from the serving LTE frequency to a configured non-serving LTE frequency.

At operation 1006, the user equipment 301 detects that there is a likelihood of in-device co-existence interference between the non-serving LTE frequency and an ISM frequency on which an ISM activity is performed by the ISM module 306. At operation 1008, the user equipment 301 rejects the handover command in the RRC reconfiguration message. At operation 1010, the user equipment 301 triggers an RRC re-establishment procedure for re-establishing a radio resource connection with the base station 310. At operation 1012, the user equipment 301 sends an RRC re-establishment request message to the base station 310 indicating that the ISM activity is ongoing and there is a likelihood of in-device coexistence interference between the non-serving LTE frequency and the ISM frequency. In one implementation, the RRC re-establishment request message includes a new rejection cause indicating that the RRC re-establishment procedure is triggered since the target non-serving LTE frequency is affected by the ISM activity.

Figure 11:
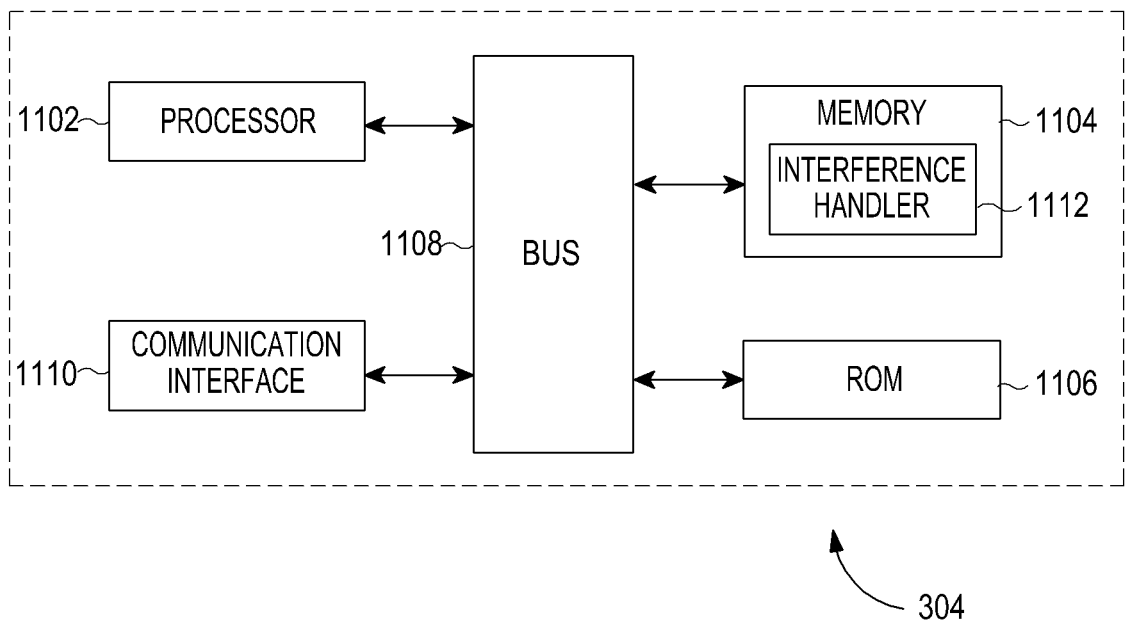
FIG. 11 illustrates a block diagram of a coordinator according to an embodiment of the present invention.

FIG. 11 illustrates a block diagram of a coordinator according to an embodiment of the present invention.

Referring to FIG. 11, a coordinator 304 includes a processor 1102, a memory 1104, a Read Only Memory (ROM) 1106, a bus 1108, and a communication interface 1110.

The processor 1102, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 1102 may also include embedded controllers, such as generic or programmable logic devices or arrays, application specific integrated circuits, single-chip computers, smart cards, and the like.

The memory 1104 may be a volatile memory and a non-volatile memory. The memory 1104 includes an interference handler 1112 for handling in-device co-existence interference between non-serving LTE frequencies and an ISM frequency, according to the embodiments illustrated in FIGS. 3 and 10. A variety of computer-readable storage media may be stored in and accessed from the memory elements. Memory elements may include any suitable memory device(s) for storing data and machine-readable instructions, such as a ROM, a Random Access Memory (RAM), an erasable programmable ROM, an electrically erasable programmable ROM, a hard drive, a removable media drive for handling memory cards, Memory Sticks, and the like.

Embodiments of the present subject matter may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 1102. For example, a computer program may include machine-readable instructions capable of handling in-device co-existence interference between non-serving LTE frequencies and an ISM frequency, according to the teachings and herein described embodiments of the present subject matter. In one embodiment of the present invention, the computer program may be included on a storage medium and loaded from the storage medium to a hard drive in the non-volatile memory.

In accordance with the one or more embodiments described in FIGS. 3 through 11, the UE 301 starts measurements on the neighboring inter frequency cells (e.g., the non-serving LTE frequencies) when the signal quality of the serving cell falls below a threshold since the base station 310 requires some measurements from the UE 301 on the neighboring inter frequency cells in order to make a handover. Therefore, if the ISM activity is complete, the UE 301 triggers a request for configuring the at least one of non-serving LTE frequency for performing measurements. In response, the UE 301 receives an updated list of non-serving LTE frequencies from the base station 310, wherein the updated list of non-serving frequencies includes the at least one of the non-serving LTE frequencies. Accordingly, the UE 301 configures the non-serving LTE frequencies in the updated list of non-serving LTE frequencies for performing a measurement.

Further, when the base station 310 is configuring non-serving LTE frequencies and the affected non-serving LTE frequencies were blocked prior to the configuration, the UE 301 may send a request to the base station 310 for configuring the blocked non-serving LTE frequencies for performing a measurement or be made as a serving frequency. For example, the UE 301 may communicate the request to the base station 310 either using a new cause and/or an information element in the connection reconfiguration complete message.

Furthermore, when there are no new measurement configurations, signal quality of the serving cell has fallen below a threshold value and the ISM module 306 is turned off, the UE 301 can send an indication to the base station 310 that the blocked non-serving LTE frequencies are re-configured for performing a measurement.

In an idle mode, the UEs typically perform cell reselections to keep themselves connected to the base station 310, receive paging, read the system information, and the like. The decision to perform cell reselection is based on serving a cell signal strength, ranking with the neighbor and network provided cell reselection priorities. Because of the network provided reselection priorities, the UE 301 may be forced to reselect to an LTE frequency affected by the ISM activity, thereby leading to problems in subsequent connection and triggering Frequency Division Multiplexing (FDM) based solutions.

In one embodiment of the present invention, the UE 301 performs reselection procedure on an LTE frequency which is not interfered by the ISM activity as the UE 301 considers the priority of interfering or interfered LTE frequencies to be lower than any of the priorities given by the network even if the network has signaled it to be a high priority. This is advantageous as if more than one frequency is available for reselection. The above rule prioritizes the non-interfered frequencies. Further, if only the affected LTE frequency is available for reselection, the cell reselection procedures make sure that this LTE frequency is only reselected if the serving cell is having a low signal strength.

In another embodiment of the present invention, the UE 301 is forced to re-select a frequency which is not interfered by the ISM activity as the UE 301 considers priorities of the interfering or interfered LTE frequencies to be lower than the priority of the serving LTE frequency, provided the UE 301 is given and is valid even if the network has signaled it to be a high priority.

When making a connection to the base station 310, the UE 301 may be camped on an LTE frequency or the LTE frequency on which the UE 301 is attempting to make the connection establishment is affected by an ISM activity. In such a case, the UE 301 may to trigger an FDM based solution at the end of connection establishment. As the FDM solution requires a handoff to be triggered and the handoff may only happen with the measurements and after completion of the security procedures which involves a substantial delay. As a result, the connection may be dropped.

In one embodiment of the present invention, when the UE 301 is aware of ISM interference on the camped LTE frequency at the time of radio resource connection establishment, the UE 301 communicates a likelihood of in-device co-existence interference between the camped LTE frequency and the ISM frequency either in an RRC connection request message or an RRC connection setup complete message. Based on the indication, the base station 310 becomes aware that the camped LTE frequency is affected by the ISM frequency and the ISM module 306 is ON. Thus, the base station 310 can move the UE 301 to an LTE frequency which is not affected by the ISM frequency. The movement can be either by accelerating measurement and handover procedure or by releasing the connection by providing the necessary parameters in the release message, such as redirection and dedicated cell reselection priorities.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for a user equipment (UE), comprising:
detecting anticipation of in-device coexistence interference between at least one of non-serving Long Term Evolution (LTE) frequencies and an Industrial, Scientific and Medical (ISM) frequency when the ISM frequency is used by the UE;
transmitting information indicating the anticipation of in-device coexistence interference between the at least one of the non-serving LTE frequencies and the ISM frequency to a base station; and
transmitting, to the base station, information on when the UE no longer suffers from the in-device coexistence interference.

2. The method of claim 1, further comprising:
receiving a list of the non-serving LTE frequencies to perform a measurement on the non-serving LTE frequencies from the base station, and
performing the measurement on the at least one of the non-serving LTE frequencies in the received list.

3. The method of claim 1, wherein detecting the anticipation of the in-device coexistence interference between the at least one of the non-serving LTE frequencies and the ISM frequency when the ISM frequency is used by the UE comprises:
receiving a Radio Resource Connection (RRC) reconfiguration message with a list of the non-serving LTE frequencies from the base station,
configuring the non-serving LTE frequencies in the received list to perform a measurement on the configured non-serving LTE frequencies, and
detecting the anticipation of in-device coexistence interference between the at least one of the non-serving LTE frequencies and the ISM frequency when the ISM frequency is used by the UE.

4. The method of claim 1, wherein the information indicating the anticipation of in-device coexistence interference between the at least one of the non-serving LTE frequencies and the ISM frequency is transmitted through a message including information indicating one or more LTE frequencies being affected by the ISM frequency.

5. The method of claim 1, further comprising:
indicating to the base station that the UE no longer suffers from the in-device coexistence interference.

6. A user equipment (UE) comprising:
a transceiver; and
at least one processor,
wherein the at least one processor is configured to:
detect anticipation of in-device coexistence interference between at least one of non-serving Long Term Evolution (LTE) frequencies and an Industrial, Scientific and Medical (ISM) frequency when the ISM frequency is used by the UE,
transmit information indicating the anticipation of in-device coexistence interference between the at least one of the non-serving LTE frequencies and the ISM frequency to a base station, and
transmit, to the base station, information on when the UE no longer suffers from the in-device coexistence interference.

7. The UE of claim 6, wherein the at least one processor is further configured to:
receive a list of the non-serving LTE frequencies to perform a measurement on the non-serving LTE frequencies from the base station, and
perform the measurement on the at least one of the non-serving LTE frequencies in the received list.

8. The UE of claim 6, wherein the at least one processor is further configured to detect the anticipation of in-device coexistence interference between the at least one of the non-serving LTE frequencies and the ISM frequency when the ISM frequency is used by the UE by:
receiving a Radio Resource Connection (RRC) reconfiguration message with a list of the non-serving LTE frequencies from the base station,
configuring the non-serving LTE frequencies in the received list so as to perform a measurement on the configured non-serving LTE frequencies, and
detecting the anticipation of in-device coexistence interference between the at least one of the non-serving LTE frequencies and the ISM frequency when the ISM frequency is used by the UE.

9. The UE of claim 6, wherein the information indicating the anticipation of in-device coexistence interference between the at least one of the non-serving LTE frequencies and the ISM frequency is transmitted through a message including information indicating one or more LTE frequencies being affected by the ISM frequency.

10. The UE of claim 6, wherein the at least one processor is further configured to:
indicate to the base station that the UE no longer suffers the in-device coexistence interference.

11. A base station comprising:
a transceiver; and
at least one processor,
wherein the at least one processor is configured to:
receive, from a user equipment (UE), information indicating anticipation of in-device coexistence interference between at least one of the non-serving Long Term Evolution (LTE) frequencies and an Industrial, Scientific and Medical (ISM) frequency of the UE, in response to the UE detecting the anticipation of the in-device coexistence interference when the ISM frequency is used, and
receive, from the UE, information on when the UE no longer suffers from the in-device coexistence interference.

12. The base station of claim 11, wherein the at least one processor is further configured to:
transmit, to the UE, a list of the non-serving LTE frequencies to perform a measurement on the non-serving LTE frequencies.

13. The base station of claim 11, wherein the at least one processor is further configured to transmit, to the UE, a Radio Resource Connection (RRC) reconfiguration message with a list of the non-serving LTE frequencies.

14. The base station of claim 11, wherein the information indicating the anticipation of in-device coexistence interference between the at least one of the non-serving LTE frequencies and the ISM frequency is received through a message including information indicating one or more LTE frequencies being affected by the ISM frequency.

15. The base station of claim 11, wherein the at least one processor is further configured to:
receive, from the UE, indication that the UE no longer suffers the in-device coexistence interference.

* * * * *